Patented Apr. 28, 1942

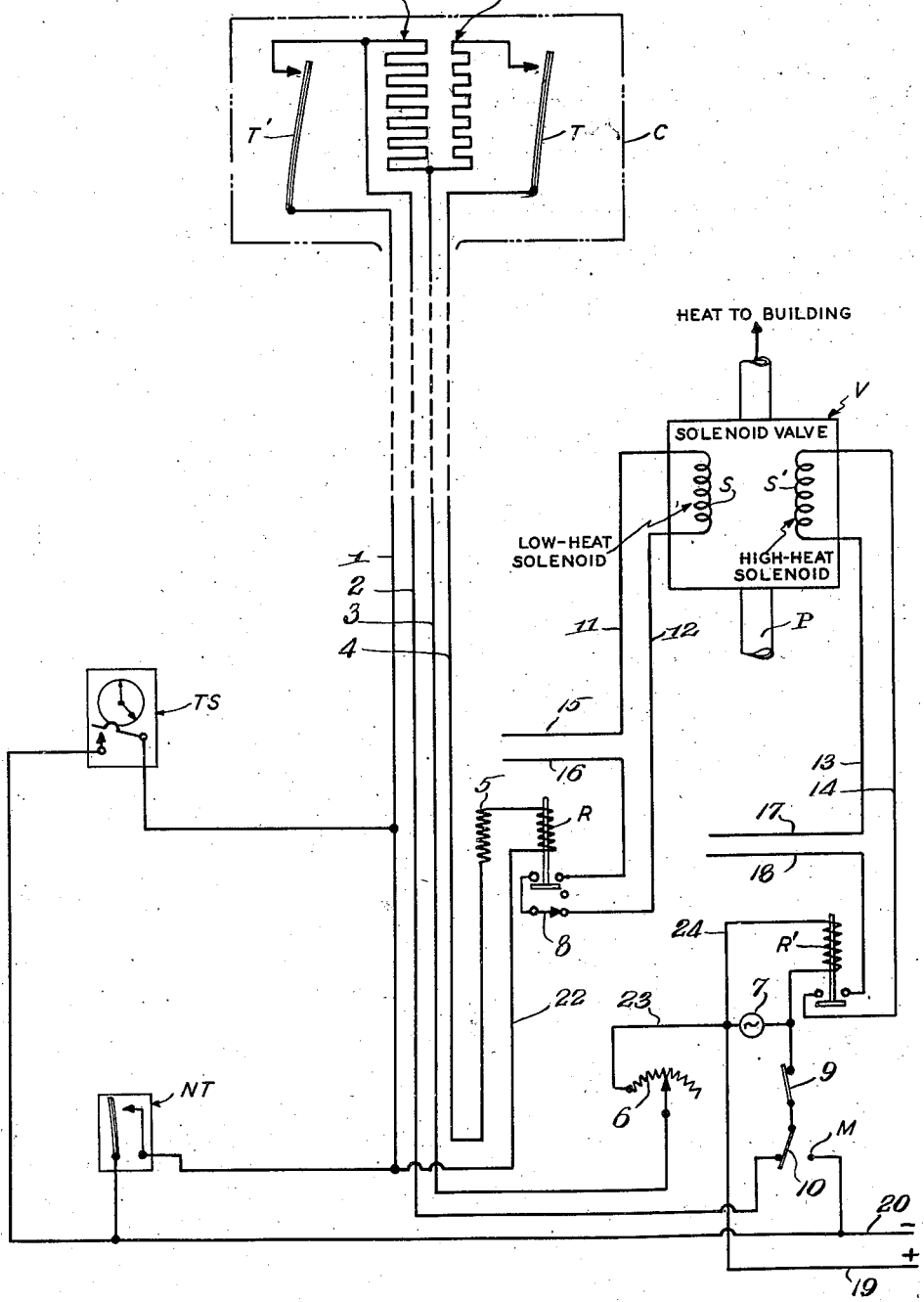

2,281,399

UNITED STATES PATENT OFFICE 2,281,399

HEAT CONTROL

Joseph Warren Wattles, 3rd, Canton, Mass., assignor to Minneapolis-Honeywell Regulator Company, Minneapolis, Minn., a corporation of Delaware Application January 7, 1939, Serial No. 249,792

2 Claims. (Cl. 236—68)

This invention relates to heat control systems of the type which employ a casing having radiation characteristics similar to those of the building to be heated and being located outside the building where it is exposed to similar weather conditions, the casing containing thermostatic means for controlling the supply of heat both to the building and also to the casing. The usual sources of heat supply comprise a steam plant for the building and electric heating units for the casing, the steam plant usually being located outside the building and the heating coils being disposed within the casing. By supplying heat to the casing and building respectively at rates sufficient to keep them at approximately equal temperatures when they are in normal condition and controlling both supplies in response to the temperature within the casing, many advantages are obtained. For example, if tenants in an apartment house waste heat by opening windows too much, the waste results merely in a temperature drop in the apartment; the amount of heat supplied to the building remains unaffected because the heat supply is responsive only to the temperature in the outside casing.

Objects of the present invention are to provide control systems of the aforesaid type which provide quicker and more accurate temperature control and which are generally superior to the control systems of the prior art.

With prior control systems of the aforesaid type it has been possible to regulate the temperature of the building only by varying the frequency and length of the periods during which heat is supplied, not by changing the rate of supply during any period or during successive periods. According to this invention the rate at which heat is supplied to the building may be varied, either with or without the other variations. This is accomplished by supplying heat to the casing at different rates proportional to the rates at which heat is supplied to the building, depending upon the outdoor temperature, the rate preferably changing by substantial steps rather than gradually. The proportional variations in the heat supplied to the casing and building are controlled by thermostatic means responsive to the temperature within the casing. By changing the heat supply in steps rather than gradually the apparatus may be greatly simplified. For example, the apparatus in the outside casing may comprise merely one or more thermostats and one or more heaters for supplying heat to the casing at different rates and the apparatus in the building need comprise only a well-known type of steam valve having a plurality of solenoids for opening the valves different degrees respectively.

For the purpose of illustration a typical embodiment of the invention is shown in the accompanying drawing in which the figure is a diagrammatic representation of a system of the aforesaid type adapted to supply heat to a building at two different rates.

The particular embodiment of the invention chosen for the purpose of illustration comprises a valve V for regulating the flow of steam through a pipe P to the radiators of a building which are not shown. Inasmuch as solenoid valves of this type are well-known the valve is shown diagrammatically, S and S' representing the solenoids of the valve. The aforesaid casing is indicated by the broken line C, a suitable construction being shown in detail in my prior Patent 2,065,844 granted December 29, 1936. Located in the casing C are two thermostats T and T', and two heating coils H and H'. These four devices are interconnected with the apparatus for controlling the valve V through four conductors 1, 2, 3 and 4. As indicated by the broken portions of the conductors all the apparatus other than that located in the casing C is placed at a remote location, preferably in a suitable control cabinet in the building to be heated. In the illustrated embodiment this control apparatus comprises two relays R and R', a time switch TS, a night thermostat NT, a resistance 5 in the conductor 4, a rheostat 6 connected to the conductor 3, a pilot light 7, manual switches 8, 9 and 10 and conductors 11 to 24 inclusive.

Solenoid S is supplied with current through a circuit 11—12 which is controlled by the relay R and the manual switch 8. When the switch 8 is closed the circuit is under the control of the relay R and when the switch is open the circuit is inoperative. The solenoid S' is controlled by relay R' through the circuit 13—14. As indicated in the drawing the solenoid circuits are supplied with current from suitable sources through the conductors 15—16 and 17—18 respectively. All the other circuits are supplied with current through the conductors 19—20.

The relay R is controlled by the thermostat T over the following circuit: conductor 20, either the night switch NT or the time switch TS, conductor 22, relay R, resistance 5, conductor 4, thermostat T, heating unit H, conductor 3, rheostat 6, conductor 23 and conductor 19 back to the other side of the source of current. The relay R' is controlled by the thermostat T' over the following circuit: conductor 20, night thermostat NT or time switch TS, conductor 1, thermostat T', conductor 2, switch 10, switch 9, relay R', conductor 24 and conductor 19 back to the other side of the source of current. Inasmuch as the pilot 7 is in parallel with the relay R' it is of course always lighted when the relay is energized. When the thermostat T' closes the circuit of relay R' it also closes the following circuit for the heater H': conductor 20, night thermostat NT or time switch TS, conductor 1, thermostat T', heater H', conductor 3, rheostat 6, conductor 23 and conductor 19 back to the other side of the source of current. Thus when the relay R is energized to operate the solenoid S the heater H is also energized, in series with the relay; and when the relay R' is energized to operate the solenoid S' the heater H' is also energized, in parallel with the relay.

The time switch TS may be adjusted to close the circuit at recurrent intervals of any desired length and frequency, such as five minutes out of every fifteen-minute interval. The night thermostat NT may be set to close at any desired temperature, such as 60°. The time switch TS is preferably arranged to close circuit only during the day time, whereby no heat can be supplied to the building during the night time until the temperature of the building drops to the point to which the night thermostat NT is set. Obviously the present invention may be utilized with only one or the other of the devices NT and TS or with neither of these devices. If neither device is employed the conductor 20 would of course be permanently connected to the conductor 1. By opening the switch 8 the solenoid S is rendered inoperative and by opening the switch 9 the solenoid S' is rendered inoperative. By shifting the switch 10 to the contact M the relay R' may be manually controlled by switch 9 through the circuit: conductor 20, switch contact M, switch 10, switch 9, relay R', conductor 24 and conductor 19 back to the other side of the source of current. During this manual control the thermostats T and T' continue to control the heaters H and H' so that the casing C is ready for automatic operation when switch 10 is shifted back to automatic operation.

As indicated in the drawing the solenoids S and S' may be arranged to supply heat to the building at low and high rates respectively. For example, the solenoid S may admit steam at a pressure of 8 ounces and the solenoid S' may admit steam at a pressure of 3 pounds. The heaters H and H' in the casing C are correspondingly adjusted, the heater H supplying a small amount of heat to the casing C and the heater H' supplying a large amount of heat to the casing C. The thermostats T and T' may be adjusted to close at any desired high and low temperatures respectively. For example, the thermostat T may operate at 66°–68° F. and the thermostat T' may operate at 64°–66° F.

From the foregoing it will be understood that when the temperature in the casing C drops to say 66° the thermostat T closes to energize the low-heat unit H and the low-heat solenoid S, the unit H heating the interior of the casing at such a rate as to open the thermostat T when the building has reached the desired temperature. In case of a drop in the outdoor temperature or in case the outdoor temperature is very low the temperature inside the casing C may drop to the point where the thermostat T' closes, thereby energizing the high-heat unit H' and the high-heat solenoid S' to supply heat to the casing and building at a more rapid rate. The heater H' is so adjusted that when the temperature in the building has risen almost to the desired level the temperature inside the casing C has risen to the point where the thermostat T' opens, thereby reducing the supply of heat to both casing and building to the lower rate. If the temperature rises to the point where even the low-rate heat is not required, thermostat T also opens wholly to discontinue the supply of heat to both casing and building.

It should be understood that the present disclosure is for the purpose of illustration only and that this invention includes all modifications and equivalents which fall within the scope of the appended claims.

I claim:

1. A system for controlling the supply of heat exchange to a zone at high or low rates comprising a casing having radiation characteristics similar to those of the zone for exposure to similar weather conditions outside the zone, control switches for regulating said heat supply at high and low rates respectively, electrical actuating means for operating the control switches, two thermostats in said casing, two heaters in said casing, and an energizing circuit for each of said electrical actuating means including in series switch means operated by one of said thermostats, one of said casing heaters, and one of said electrical actuating means, the casing heater in the energizing circuit for the electrical actuating means for the high rate control switch supplying heat to the casing at a higher rate than the other casing heater.

2. A system for controlling the supply of heat exchange to a zone at high or low rates comprising a casing having radiation characteristics similar to those of the zone for exposure to similar weather conditions outside the zone, means for regulating said heat supply at high and low rates respectively, high rate and low rate heaters in said casing for supplying heat to the casing at high and low rates, thermostatic means in the casing for selectively controlling the high rate heat supply regulating means and the high rate casing heater, and the low rate heat supply regulating means and the low rate casing heater, the casing heaters being energized through control switches mechanically operated by the thermostatic means.

JOSEPH WARREN WATTLES, 3RD.